July 28, 1959 G. F. ROGERS 2,897,262
COLOR TELEVISION RECEIVERS
Filed June 27, 1955
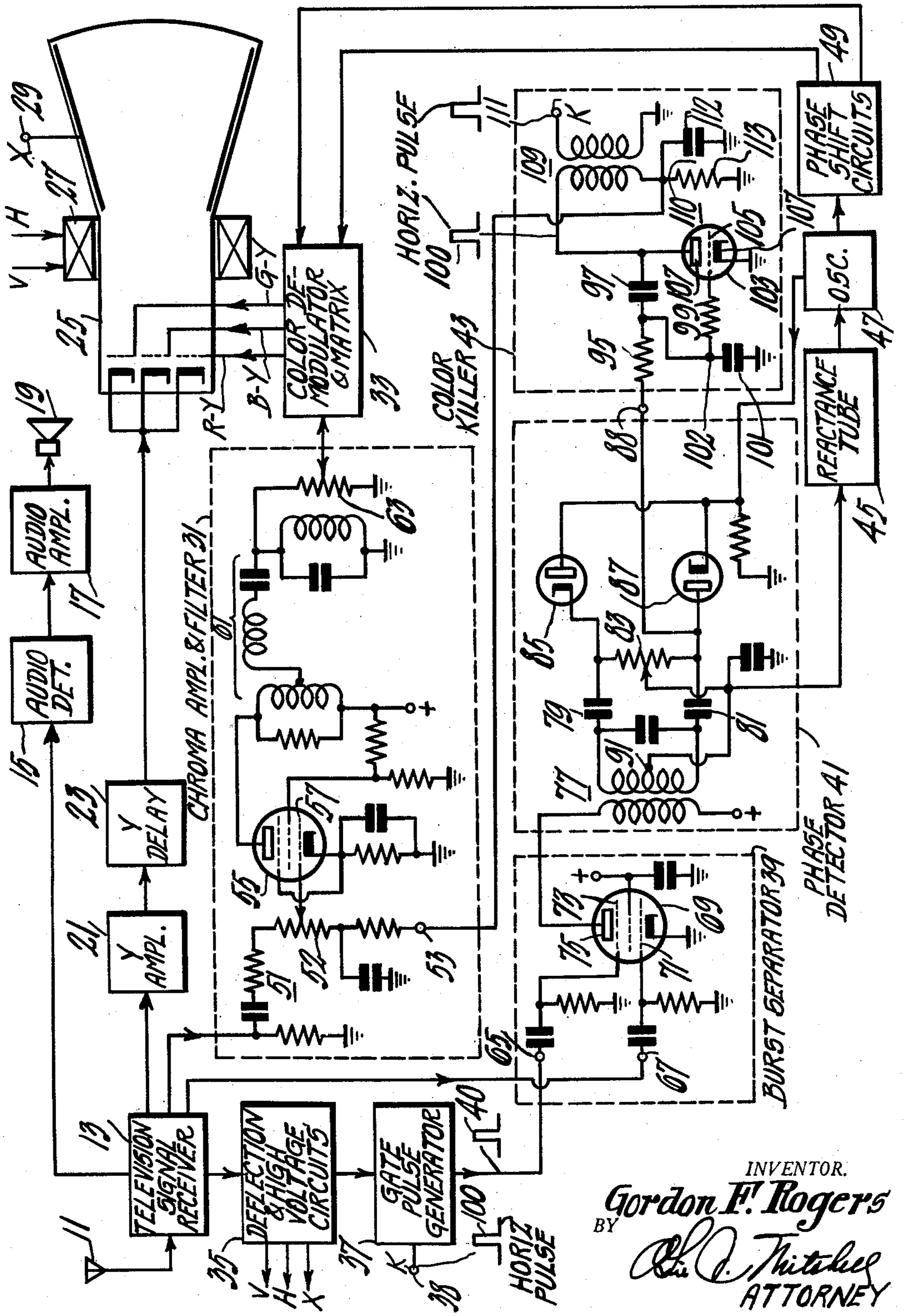
INVENTOR.
Gordon F. Rogers
BY
ATTORNEY United States Patent Office 2,897,262

Patented July 28, 1959

2,897,262

COLOR TELEVISION RECEIVERS

Gordon F. Rogers, Lincolnwood, Ill., assignor to Radio Corporation of America, a corporation of Delaware Application June 27, 1955, Serial No. 518,057

2 Claims. (Cl. 178—5.4)

The present invention relates to synchronizing-signal-control of on-off operation of amplifier circuits and in particular relates to color-killer circuits for use in a color television receiver.

In the color television signal conforming to present standards, there is included a luminance signal which describes the luminance or monochrome information in the transmitted color image. The luminance signal has frequency components up to 4.2 mcs. In addition, there is included a chrominance signal having frequency components from substantially 2 to 4.2 mcs. and color synchronizing bursts which provide reference phase information which permit the demodulation of the chrominance signal by synchronous demodulation.

If a monochrome signal is received by a color television receiver, the monochrome signal will be processed in appropriate luminance signal channels and reproduced in shades of gray from black to white on the color image reproducer. However, since the monochrome signal may have high frequency components in the frequency range of the chrominance signal, it is important that none of these high frequency components find their way through the chrominance channel of the color television receiver in a manner which would cause spurious color response on the color image reproducer when receiving monochrome signals. A color-killer circuit may therefore be utilized for turning off the chrominance channels in the color television receiver when the color synchronizing bursts are absent.

It is therefore an object of this invention to provide an improved and simplified color-killer circuit for use in a color television receiver.

According to the invention, there is provided a first control signal indicative of the presence or absence of color synchronizing bursts or other synchronizing signals. A second control signal is provided. A third control voltage is developed in response to the first and second control signals when the synchronizing signals are absent; the third control voltage is used for color killer action or to turn off prescribed amplifier channels.

In one form of the invention, signals indicative of the presence or the absence of bursts in a television signal are utilized with pulses to control the conduction of an electron control device. The electron control device, coupled to a time constant circuit conducts pulse energy through the time constant circuit during pulse time only when the bursts are absent and develops a control voltage across the time constant circuit responsive to the pulses. The pulses not only energize the time constant circuit by producing pulse energy which is conducted through the electron control device, but also drive the electron control device to produce peak conduction through the electron control device and also an amplitude limiting of the pulses applied to drive that device. The control voltage is in turn used to control the gain of the chrominance channel.

Other and incidental objects of this invention become apparent upon a reading of the following specification and a study of the single figure of the drawing which shows a color television receiver utilizing the present invention.

The incoming color television signal arrives at the antenna 11 and is applied to the television signal receiver 13. The television signal receiver 13 performs the function of first detection, intermediate frequency amplification and second detection, and yields a recovered color television signal including the audio information which is transmitted on a frequency modulated sound carrier 4½ mcs. removed from the picture carrier.

Using, for example, an intercarrier sound circuit, the audio information is separated from the recovered color television signal in the audio detector 15. The audio information is then amplified in the audio amplifier 17 and applied to the loud speaker 19.

The picture information in the recovered color television signal is applied to each of several branches.

In one branch, the color television signal is applied to the deflection and high voltage circuits 35 wherein the picture synchronizing pulses are separated and utilized to supply vertical (V) and horizontal (H) deflection signals to the yokes 27; a high voltage (X) to the ultor 29; in addition, excitation is provided for driving the gate pulse generator 37 which produces a horizontal retrace pulse 100 and also a gate pulse 40 which has a duration interval in time coincidence with the duration interval normally occupied by the color synchronizing bursts in the horizontal retrace interval.

The recovered color television signal is applied to the burst separator 39 in which, in response to the gate pulse 40 which has a duration interval substantially that of the color synchronizing bursts, the color synchronizing bursts, when occurring, are separated. The separated color synchronizing bursts are applied to the phase detector 41 to which is also applied the output signal of the oscillator 47. The phase detector 41 compares the phases of the color synchronizing bursts and the output signal of the oscillator 47 respectively, and provides a phase-difference-indicative signal to the reactance tube 45. The reactance tube 45, in response to the phase-difference-indicative voltage provided by the phase detector 41 then adjusts the frequency and phase of the oscillator 47 to that prescribed by the color synchronizing bursts. The output of the oscillator 47 is used to drive the phase shift circuits 49 which apply at least a pair of synchronous demodulating signals to the color demodulators and matrix 33.

The recovered color television signal is applied to the chroma amplifier and filter 31 which removes the luminance components having frequencies below at least 2 mcs. thereby substantially separating the chrominance signal information from the majority of the luminance signal. The resultant filtered color television signal, constituting principally a chrominance signal, is then applied to the color demodulators and matrix 33. Utilizing the circuits for synchronous demodulation described in detail, for example, by Pritchard and Rhodes in their paper entitled "Color Television Signal Demodulators" as published in the June 1953 issue of the RCA Review, a trio of color difference signals denoted as $R-Y$, $B-Y$, and $G-Y$ are formed. Y denotes the luminance signal and the $R-Y$, $B-Y$, and $G-Y$ color difference signals describe how the red, blue and green colors in the televised scene differ from the corresponding color content contained in the luminance or Y signal. The $R-Y$, $B-Y$, and $G-Y$ color difference signals are applied to appropriate control grids of the color image reproduced 25. At the same time, the color television signal in the form of the Y signal is applied through the Y amplifier 21 and Y delay 23 to the cathodes of the color image reproducer 25. The Y and the $G-Y$, $B-Y$, and $R-Y$ color difference signals are then added within the color image reproducer to produce red, green, and blue component color signals; i.e. R, G, and B signals which permit reconstruction of the televised color image on the image face of the color image reproducer 25.

The amplification of the chrominance signal through the chroma amplifier and filter 31 is subject to control by the color killer 43 which provides a bias voltage to the control grid 57 of the electron tube 55. The color television signal, provided by the television signal receiver 13, passes through the input network 51 and is impressed on the control grid 57 of the electron tube 55. The electron tube 55 drives the filter circuit 61 which has pass band characteristics corresponding to the bandwidth of the chrominance signal. The filter 61 includes a potentiometer 63 which is then utilized to supply the gain controlled chrominance signal at suitable level to the color demodulators and matrix 33.

When the color synchronizing bursts are not present in the signal which is recovered by the television signal receiver 13, then the burst separator 39 supplies no color synchronizing bursts to the phase detector 41. The burst separator 39 consists principally of the electron tube 69 to whose control grid 71 the signal from the television signal receiver 13 is applied; the gate pulse 40 is applied to the third grid 73. The gate pulse 40 causes the electron tube 69 to conduct for the duration interval of the gate pulse. If any color synchronizing bursts are present during this period, they are caused to be developed across the resonant circuit 77 of the phase detector 41.

The phase detector 41 consists of the resonant circuit 77 which applies the signal derived from the burst separator 39, to the cathode of the rectifier 85 in one phase, and in reverse phase to the anode of the rectifier 87. At the same time the output signal from the oscillator 47 is applied simultaneously to the cathode of the tube 87 and to the anode of the tube 85. Associated with these circuit parameters are the condensers 79 and 81 and the potentiometer 83 which form a path whereby when the phase of the color synchronizing bursts and the phase of the signal provided by the oscillator 47 are 90° out of phase, the voltages across condensers 79 and 81 will be substantially equal and opposite in sign. The voltage provided at the contact of the potentiometer 83 may be then adjusted whereby a voltage will be developed at a point on the potentiometer 83 with respect to ground which is a function of the phase difference between the color synchronizing bursts and the output signal of the oscillator 47 and which will fall to zero when the aforementioned 90° phase difference is achieved. The signal as provided by the potentiometer 83 is then utilized to control the reactance tube 45, which, as previously described, controls the frequency and phase of the output signal of the oscillator 47.

It is important to note in connection with the phase detector 41 that the potential at the terminal 88 which is coupled to the anode of the tube 87 will furnish a negative bias voltage having an amplitude dependent upon the amplitude of the color synchronizing bursts. When the color synchronizing bursts are present the value of the negative bias developed at the terminal 88 will vary as the amplitude of the color synchronizing bursts. When no color synchronizing bursts are present, then the least negative bias will be developed at the terminal 88. Output terminal 88 then furnishes a large negative bias when the color synchronizing bursts are present and a negative bias of less magnitude when the color synchronizing bursts are absent.

Consider now the operation of the color killer 43 which is utilized to provide a bias voltage to the control grid 57 of the electron tube 55 whereby when color synchronizing bursts are present thereby signifying the presence of the color television signal transmission, the electron tube 55 is biased to a condition whereby it passes signal energy. When no color synchronizing bursts are present, then the color killer 43 supplies a bias potential to the control grid 57 which biases off the electron tube 55. The color killer circuit as illustrated by the embodiment shown in the figure of the drawing, performs in the following fashion. The horizontal pulse 100 applied to the transformer 109 develops a large positive pulse voltage between the anode 107 of tube 103 and the time constant circuit 110 having a time constant which is long compared to the pulse repetition period. The triode 103 is coupled substantially in series with secondary of the transformer 109 and the time constant circuit 110 consisting of capacitor 112 and resistor 113. The control grid 105 of the triode 103 is connected through resistor 99 to terminal 102 of the condenser 101. A bias voltage is also furnished at the terminal 102 from the phase detector 41 by way of the anode of the diode 87 and the resistor 95. A pulse voltage which is a replica of the horizontal pulse 100 but reduced in amplitude by the capacitive voltage dividing action of condensers 97 and 101, is also applied to the terminal 102.

The horizontal pulse 100 develops a positive pulse voltage at the plate 107 of tube 103. The horizontal pulse 100 also provides a positive pulse potential at the terminal 102. When the color synchronizing bursts are present, a large negative bias voltage is also applied to the terminal 102 by the phase detector 41. The bias voltage provided by the phase detector 41 is of sufficient magnitude to oppose the positive pulse potential developed at the terminal 102 in a manner whereby the triode 103 is cut off for the positive pulse voltage developed at the plate 107 of tube 103. Since the tube 103 presents an open circuit in the series circuit consisting of the tube 103, the secondary of the transformer 109 and the time constant circuit 110, no current flows through the time constant circuit 110 and no voltage is developed across this circuit 110. The zero D.C. voltage with respect to ground which appears across the time constant circuit 110 is coupled to the control grid 57 of the electron tube 55. By proper choice of the parameters of the cathode biasing network 56, the amplifier tube 55 is provided with proper grid bias to amplify the color television signal which is also applied to the control grid 57.

When the color synchronizing bursts are absent, a D.C. bias voltage of substantially less negative value than that developed when the color synchronizing bursts are present, is supplied to the terminal 102 by the phase detector 41. The horizontal pulse 100 still provides a positive pulse voltage to the plate 107 and also develops a positive pulse voltage at the terminal 102. However, the combination of the potentials provided at the terminal 102 by both the phase detector 41 and horizontal pulse 100 causes the triode 103 to conduct during the horizontal pulse interval. The conduction of the triode 103 causes a negative potential to be developed across the time constant circuit 110. The time constant circuit 110 then provides a negative voltage to the control grid 57 of the electron tube 55 of sufficient magnitude to bias the electron tube 55 beyond cut off. The biasing of the electron tube 55 beyond cut off in turn prevents any signals from passing through the chroma amplifier and filter 31 so that higher frequency components of a received signal which does not contain color information, are not allowed to reach the color demodulators and matrix 33. In this way, spurious color response during monochrome signal transmission is eliminated.

The resistor 99 provides coupling between terminal 102 and the grid 105 of the tube 103. When the color synchronizing bursts are absent, the grid 105 of tube 103 may tend to go positive and thus draw grid current on the positive excursion of the horizontal pulse 100. If resistor 99 were short-circuited, this grid current would provide sufficient negative bias so that only the peak of the horizontal pulse 100 would provide zero bias for the tube 103. Thus, the plate current of the tube 103 and consequently the voltage developed across the time constant circuit 110 would be reduced. With a proper value for resistor 99, less grid current flows and also the potential of the control grid 105 is held at substantially zero bias more nearly throughout the positive excursion of the horizontal pulse 100 rather than just at the peak of the pulse. This is brought about during the positive excursion of the horizontal pulse in that when the potential of the terminal 102 reaches a potential of zero with respect to the cathode 114 of tube 103, any further increase in potential at terminal 102 does not cause a corresponding increase of potential at the control grid 105. The instantaneous pulse potential at control grid 105 is determined by the product of the potential at terminal 102 and the ratio of the conduction resistance between the control grid 105 and the cathode 114 to the sum of the above conduction resistance and the resistance provided by the resistor 99. The plate current of tube 103 is thereby increased by the addition of resistor 99 since the control grid 105 is held at substantially zero bias throughout the positive excursion of the horizontal pulse 100 instead of just at the peak of the positive excursion. When color synchronizing bursts are present, the bias from the phase detector 41 is sufficient to prevent the control grid 105 from drawing current and thus resistor 99 has no effect for this condition.

The size of condenser 101 with respect to the size of condenser 97, determines the amplitude of the negative bias required from the phase detector 41 to cause the tube 103 to be cut off at all times when color synchronizing bursts are present thereby causing the voltage across the time constant circuit 110 to be zero. Pulses from the gate pulse generator 37 which appear at the terminal 38 are applied through suitable connections, not shown, to the terminal 111 of the transformer 109. These pulses are coupled from the primary to the secondary winding of the transformer 109 in a manner that the anode 107 of the tube 110 is driven in a positive direction with respect to ground. Condensers 97 and 101 may be considered as forming a capacitive voltage divider which is used to reduce the amplitude of the horizontal pulse 100 to a suitable value for application to the control grid 105.

Having described the invention, what is claimed is:

1. In a color television receiver, the combination of, a source of television signals having horizontal retrace intervals and occurring according to either of two modes of signals, said first mode of signals describing color television signal transmission and including color synchronizing bursts having prescribed frequency and phase and occurring at predetermined intervals, and said second mode of signals representing monochrome signal transmission and characterized by the absence of said color synchronizing bursts, a chrominance signal amplifier circuit for amplifying at least a first prescribed frequency range of said television signal and having a gain control terminal, means coupling said chrominance amplifier to said source, a burst separating and phase detection circuit coupled to said source for developing a first control signal which is indicative of whether said color synchronizing bursts are present or absent, a pulse developing circuit including output circuit means at which is produced positive pulses during horizontal retrace intervals, a time constant circuit, an electron tube having a cathode, anode and control grid, means to connect said output circuit of said pulse developing circuit and said time constant circuit to provide a series current path between the cathode and anode of said electron tube so that said pulses drive said anode positive with respect to said cathode, potential divider means operatively connected to said pulse developing means to provide said positive pulses at a reduced amplitude, resistance means to apply said first control signal and said reduced-amplitude positive pulses from said phase separating and detection circuit and said potential divider respectively to the control grid of said electron tube to cause said electron tube to conduct current through said time constant circuit in response to said positive pulses only during said second mode of signals and means coupling said time constant circuit to said gain control terminal so that the potential developed across said time constant circuit in response to the circuit conducted through said electron tube disables said chrominance amplifier for the effective amplification of signals applied thereto.

2. In a color television receiver, the combination of, a source of television signals occurring according to either of two modes of signals, said first mode of signals representing color television signal transmission and including color synchronizing bursts having prescribed frequency and phase and occurring at predetermined intervals, and said second mode of signals representing monochrome signal transmission and characterized by the absence of said color synchronizing bursts, a chrominance signal amplifier circuit for amplifying at least a first prescribed frequency range of said television signal and having a gain control terminal, means coupling said chrominance amplifier to said source, burst separating and phase detection circuit means coupled to said source for developing a first control signal which is indicative of whether said color synchronizing bursts are present or absent, pulse developing circuit means including an output circuit at which is produced pulses, a time constant circuit, an amplifying device having a control electrode, an output electrode and a third electrode, means to connect said output circuit of said pulse developing circuit means and said time constant circuit to provide a series current path between the output electrode and third electrode of said amplifying tube in a manner that said pulses cause current to flow between said output electrode and said third electrode, potential divider means operatively connected to said pulse developing means to provide said pulses at reduced amplitude, means to apply said first control signal from said burst separating and phase detection circuit means and said reduced amplitude pulses from said potential divider means between the control electrode and third electrode of said amplifying device to cause said amplifying device to conduct current through said time constant circuit in response to said pulses only during said second mode of signals, and means coupling said time constant circuit to said gain control terminal so that the potential developed across said time constant circuit in response to the current conducted through said amplifying device disables said chrominance amplifier for the effective amplification of signals applied thereto.

References Cited in the file of this patent

UNITED STATES PATENTS

| | | |
|---|---|---|
| 2,681,379 | Schroeder | June 15, 1954 |

OTHER REFERENCES

RCA Model CT–100; Service Data 1954 T3; first printing March 31, 1954.